(12) United States Patent
Engström

(10) Patent No.: US 8,506,208 B2
(45) Date of Patent: Aug. 13, 2013

(54) SHIM PLATE FOR MILLING TOOLS FOR CHIP REMOVING MACHINING AS WELL AS A MILLING TOOL HAVING SUCH A SHIM PLATE

(75) Inventor: Tord Engström, Sandviken (SE)

(73) Assignee: Sandvik Intellectual Property AB, Sandviken (SE)

( * ) Notice: Subject to any disclaimer, the term of this patent is extended or adjusted under 35 U.S.C. 154(b) by 296 days.

(21) Appl. No.: 12/893,054

(22) Filed: Sep. 29, 2010

(65) Prior Publication Data

US 2011/0081209 A1    Apr. 7, 2011

(30) Foreign Application Priority Data

Oct. 6, 2009    (SE) ........................................ 0950731

(51) Int. Cl.
*B23C 5/20*    (2006.01)
(52) U.S. Cl.
CPC ...................................... *B23C 5/20* (2013.01)
USPC ................................ 407/46; 407/40; 407/101
(58) Field of Classification Search
USPC .................................. 407/33, 34, 40, 46, 101
IPC ................................................. B23C 5/20, 5/22
See application file for complete search history.

(56) References Cited

U.S. PATENT DOCUMENTS

| 3,341,920 | A | | 9/1967 | Kelm | |
|---|---|---|---|---|---|
| 3,540,102 | A | | 11/1970 | Yogus et al. | |
| 4,808,044 | A | * | 2/1989 | Tsujimura et al. | 407/42 |
| 4,938,639 | A | | 7/1990 | Lockard | |
| 5,682,803 | A | * | 11/1997 | Boianjiu | 82/1.11 |
| 5,855,457 | A | * | 1/1999 | Arai et al. | 407/40 |
| 5,938,377 | A | | 8/1999 | Jordberg et al. | |
| 7,422,395 | B2 | * | 9/2008 | Huang | 407/107 |
| 2008/0273931 | A1 | * | 11/2008 | Spitzenberger | 407/51 |

FOREIGN PATENT DOCUMENTS

| DE | 2 023 648 | | 11/1970 |
|---|---|---|---|
| DE | 30 21 355 | A1 | 12/1981 |
| DE | 196 53 921 | A1 | 7/1997 |
| DE | 10 2006 017 074 | A1 | 10/2007 |
| EP | 0 342 692 | A2 | 11/1989 |
| EP | 2 198 997 | A2 | 6/2010 |
| FR | 2 074 903 | A5 | 10/1971 |
| GB | 2332161 | A * | 6/1999 |
| WO | 2006/130073 | | 12/2006 |

* cited by examiner

*Primary Examiner* — Daniel Howell
*Assistant Examiner* — Alan Snyder
(74) *Attorney, Agent, or Firm* — Morgan, Lewis & Bockius LLP

(57) ABSTRACT

A shim plate for milling tools for chip removing machining, including an upperside, an underside, and at least one side surface extending between the upperside and the underside and forming an angle ≦90° with the upperside. A through hole includes a first section mouthing in the upperside, and a second section mouthing in the underside and having a diameter that is smaller than a diameter of the first section. The upperside at least partially transforms into the side surface via an edge portion configured to be an active auxiliary chip-removing cutting edge upon failure of a cooperating cutting insert. The edge portion includes a chamfer surface that forms an obtuse angle (δ) with the upperside.

36 Claims, 8 Drawing Sheets

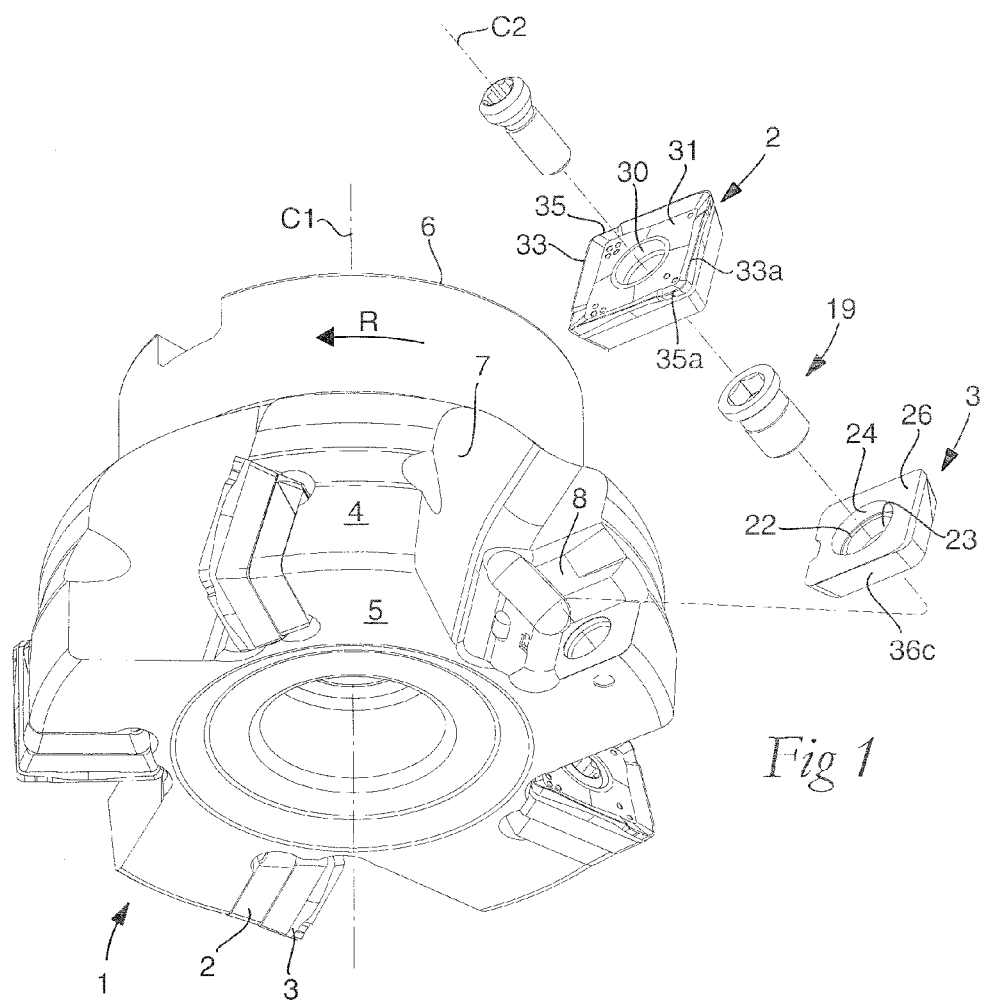
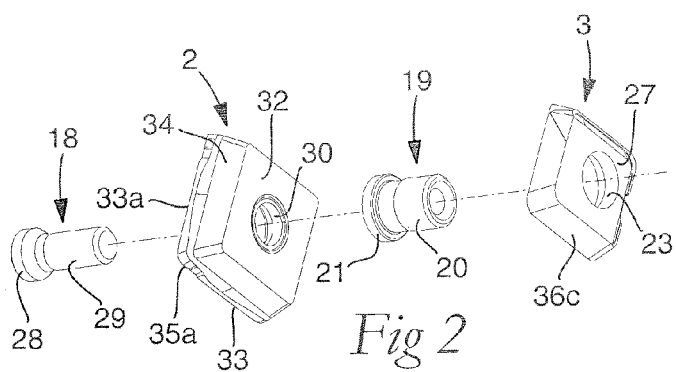

SHIM PLATE FOR MILLING TOOLS FOR CHIP REMOVING MACHINING AS WELL AS A MILLING TOOL HAVING SUCH A SHIM PLATE

This application claims priority under 35 U.S.C. §119 to Swedish Patent Application No. 0950731-0, filed on Oct. 6, 2009, which is incorporated by reference herein in its entirety.

FIELD OF THE INVENTION

The present invention relates generally to a shim plate of the type that is used in milling tools for chip removing machining, and that includes an upperside, an underside, and at least one side surface extending between the same and forming an angle of maximum 90° with the upperside, wherein a through hole includes a first section mouthing in the upperside, and a second section mouthing in the underside and having a diameter that is smaller than the diameter of the first section, besides which the upperside, at least partially, transforms into the side surface via an edge portion, when need arises, serves as an auxiliary chip-removing cutting edge. The invention also relates generally to a milling tool that makes use of such shim plates. Milling tools or milling cutters of the kind in question are suitable for chip removing or cutting machining, in particular end and/or face milling, of workpieces of metal, such as steel, cast iron, aluminium, titanium, yellow metals, etc. The tools may also be used for the machining of composite material of different types.

BACKGROUND OF THE INVENTION

In milling cutters having shim plates that are arranged under replaceable milling inserts, the individual shim plate has an important task in preventing—or at least as far as possible counteracting—serious damage in the event of an insert breakdown. Namely, if the co-operating milling insert suddenly would lose its cutting capacity during operation, e.g., as a consequence of fractures or other unexpected faults, the basic body of the milling cutter may dig into the workpiece and cause expensive damage not only to the proper basic body but also to the driving spindle and the parts of the machine tool co-operating with the same. For this reason, the shim plate is mounted in such a way that the edge portion thereof positioned rotationally behind the chip-removing cutting edge of the milling insert, on one hand, protrudes radially a distance in relation to the envelope surface of the basic body, but, on the other hand, is located inside an imaginary circle described by the cutting edge during the rotation of the milling cutter. During normal conditions, i.e., as long as the milling insert is in working order, the peripheral edge portion of the shim plate clears from the generated surface in the workpiece, at the same time as the envelope surface of the basic body positioned rotationally behind the shim plate is situated radially inside an imaginary circle described by the edge portion of the shim plate. Therefore, if an insert breakdown would occur, the peripheral edge portion of the shim plate can proceed to remove chips from the workpiece without the rotating basic body digging into the workpiece. In other words, the edge portion of the shim plate can passably assume the chip-removing function of the milling insert during the short time that is required to interrupt the milling operation before a more extensive tool and machine breakdown occurs. Another task for the shim plate is to form a reliable and accurately located long-term bottom support for the milling insert, at the same time as the receiving seat in the basic body is protected against heat. For this reason, the shim plate is usually manufactured from a material, such as cemented carbide, that is harder than the material of the basic body, which in turn most often is formed of steel or aluminium. The shim plate is connected semi-permanently with the basic body, usually via a tubular screw that includes, on one hand, a male thread that is tightened in a female thread in a hole that mouths in a bottom of a seat of the milling insert, and on the other hand a female thread in which a male thread on the tightening screw can be tightened to fix the milling insert. In contrast to the shim plate—which under good conditions can work during the entire service life of the basic body without needing to be replaced—the milling insert is replaced on repeated occasions. In order to avoid a non-uniform wear of the upperside of the shim plate, the same is face ground at the same time as the underside of the milling insert is allowed to protrude radially a short distance (0.1-0.2 mm) outside the radially outer edge portion of the shim plate. In such a way, it is avoided that the numerous milling inserts gradually coin and deform the upperside of the shim plate.

In many milling cutters, the milling inserts are tipped (and thereby also the shim plates) into particular so-called tipping-in positions axially as well as radially. More precisely, the individual milling insert can be tipped into, on one hand, a positive, axial tipping-in angle, which means that the chip-removing cutting edge is tilted in the direction upward/rearward in the direction of rotation, and on the other hand a negative, radial angle, which allow the clearance surface behind the cutting edge to clear the generated surface in the workpiece. Generally, the milling inserts become more easy-cutting the greater the positive, axial tipping-in angle is.

Problems that above all are associated with such easy-cutting milling cutters that make use of indexable milling inserts mounted in relatively great axial tipping-in angles in the basic body form a basis of one or more embodiments of the invention.

In previously known shim plates having a polygonal basic shape, the uppersides thereof have extended as a continuous, plane surface up to a straight edge or boundary line that forms a direct transition to the connecting side surface. If the angle between the upperside and the side surface amounts to 90° (for milling inserts having a neutral cutting geometry), the edge portion in question of the shim plate obtains a right-angled shape as viewed in cross-section, while the same obtains an acute-angled cross-sectional shape if the angle between the upperside and the side surface is smaller than 90° (for milling inserts having a positive cutting geometry). In both cases, the upperside of the shim plate has to have an area that is somewhat smaller than the area of the underside of the milling insert, because the last-mentioned one—as pointed out above—has to protrude a short distance from the upperside of the shim plate so that the milling insert should not coin and deform the upperside of the shim plate.

When a polygonal, indexable milling insert has a positive cutting geometry, the same may be compared to a truncated and upside-down pyramid, the upperside of which has a larger area (and circumference) than the underside. It is in the same way with the shim plate because the side surfaces thereof should run parallel to or radially inside the clearance surfaces of the milling insert. In other words, the upperside of the shim plate has also a larger area (and circumference) than the underside thereof. For reasons easily realized, the area difference increases between the uppersides and the undersides by increasing nominal clearance angles of the clearance surfaces of the milling insert and the side surfaces of the shim plate, respectively.

A serious shortcoming of previously known shim plates for milling cutters having milling inserts that are tipped in at least medium-sized axial tipping-in angles is that they obtain a mediocre bottom support in the appurtenant seat in the basic body because their supporting undersides become smaller by increasing axial tipping-in angles, and that the edge portions, which serve as auxiliary cutting edges in the event of insert breakdowns, are not very resistant to the abrupt and great stresses that they may be subjected to.

The present invention aims at obviating the above-mentioned shortcomings of previously known shim plates. An object of the invention to provide a shim plate that is suitable for rotatable tools in the form of milling cutters and, on one hand, has an edge portion of great strength and robustness serving as an auxiliary cutting edge, and on the other hand affords a good bottom support in the appurtenant seat. In this connection, the shim plate should be constructed in such a way that the upperside thereof is not coined or in another way deformed in connection with a large number of repetitive exchanges of milling inserts. In addition, the shim plate should afford good precision in respect of its own and the milling insert's three-dimensional position in the basic body. Still another object is to provide a shim plate that performs well also when the co-operating milling insert is tipped in at great axial tipping-in angles.

SUMMARY OF THE INVENTION

In an embodiment, the invention provides a shim plate for milling tools for chip removing machining, including an upperside, an underside, and at least one side surface extending between the upperside and the underside and forming an angle $\leq 90°$ with the upperside. A through hole includes a first section mouthing in the upperside, and a second section mouthing in the underside and having a diameter that is smaller than a diameter of the first section. The upperside at least partially transforms into the side surface via an edge portion configured to be an active auxiliary chip-removing cutting edge upon failure of a cooperating cutting insert. The edge portion includes a chamfer surface that forms an obtuse angle ($\delta$) with the upperside.

In another embodiment, the invention provides a milling tool for chip removing machining, including a basic body, which includes two ends between which a center axis (C1) extends, around which the basic body is rotatable and with which an envelope surface is concentric; an indexable milling insert, which includes an upperside, an underside and at least one clearance surface that extends between the upperside and the underside and connects to a chip-removing cutting edge; and a shim plate. The shim plate includes an upperside against which the underside of the milling insert is pressed; an underside that is pressed against a bottom in a seat recessed in the basic body; at least one side surface extending between the upperside and the underside and forming an angle of $\leq 90°$ with the upperside; a through hole extending between the upperside and the underside of the shim plate, the through hole including an upper section having a greater diameter than a lower section, to house a screw semi-permanently fixed in the basic body; the upperside of the shim plate at least partially transforming into the side surface via an edge portion configured to temporarily be an auxiliary chip-removing cutting edge upon failure of the milling insert, wherein the edge portion of the shim plate includes a chamfer surface that is delimited between outer and inner boundary lines and forms an obtuse angle ($\delta$) with the upperside of the shim plate. The underside of the milling insert projects radially a distance past the inner boundary line of the chamfer surface.

BRIEF DESCRIPTION OF THE DRAWINGS

The accompanying drawings, which are incorporated herein and constitute part of this specification, illustrate the presently preferred embodiments of the invention, and together with the general description given above and the detailed description given below, serve to explain features of the invention.

FIG. 1 is a perspective view of a milling tool in the form of an end mill that includes a rotatable basic body as well as a plurality of replaceable milling inserts that co-operate with shim plates one of which is shown in exploded bird's eye view together with the appurtenant milling insert;

FIG. 2 is an exploded view showing the same milling insert and shim plate in bottom perspective view;

DETAILED DESCRIPTION OF THE PREFERRED EMBODIMENTS

Figure 3:
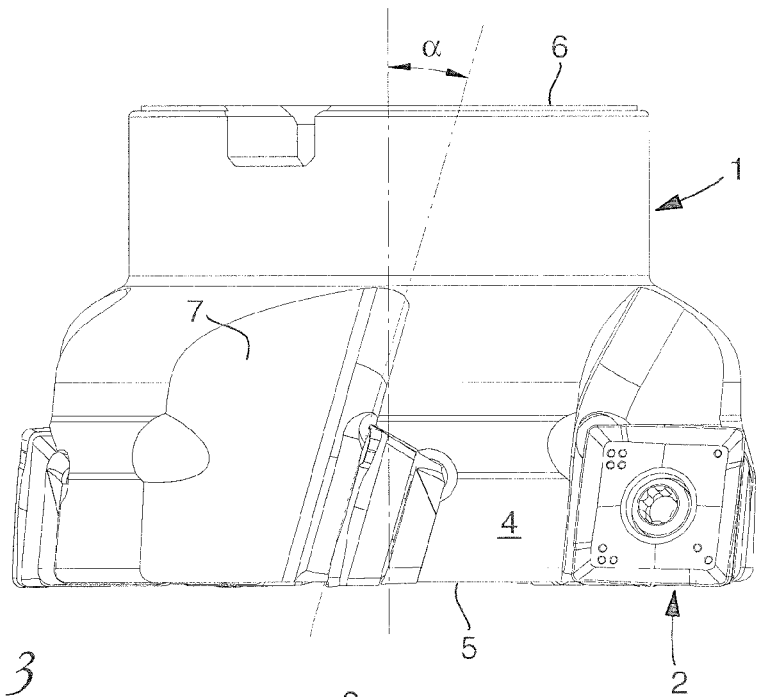
FIG. 3 is a side view of the milling tool in the assembled state.
Figure 4:
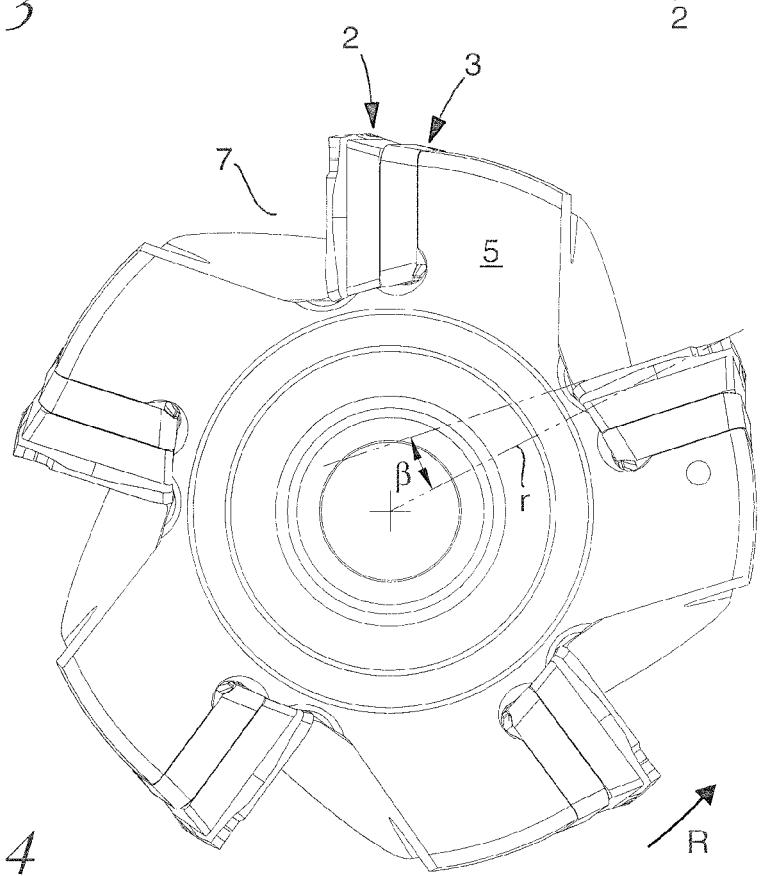
FIG. 4 is an end view from below of the assembled milling tool.

The assembled milling tool shown in the drawings includes a basic body 1 and a plurality of milling inserts 2, each one of which co-operates with a shim plate 3 according to the invention. The basic body or the milling cutter body 1 (see FIG. 1) is rotatable in the direction of rotation R around a center axis designated C1, and has a rotationally symmetrical envelope surface 4, as well as front and rear end surfaces 5, 6. In the envelope surface 4 as well as in the front end surface 5, a number of chip pockets 7 open, each one of which includes a seat 8 recessed in a bottom of the pocket for the receipt of a shim plate 3 and a milling insert 2 mounted on the same. In the example, the number of chip pockets—and thereby the number of milling inserts and shim plates—amounts to five.

Figure 7:
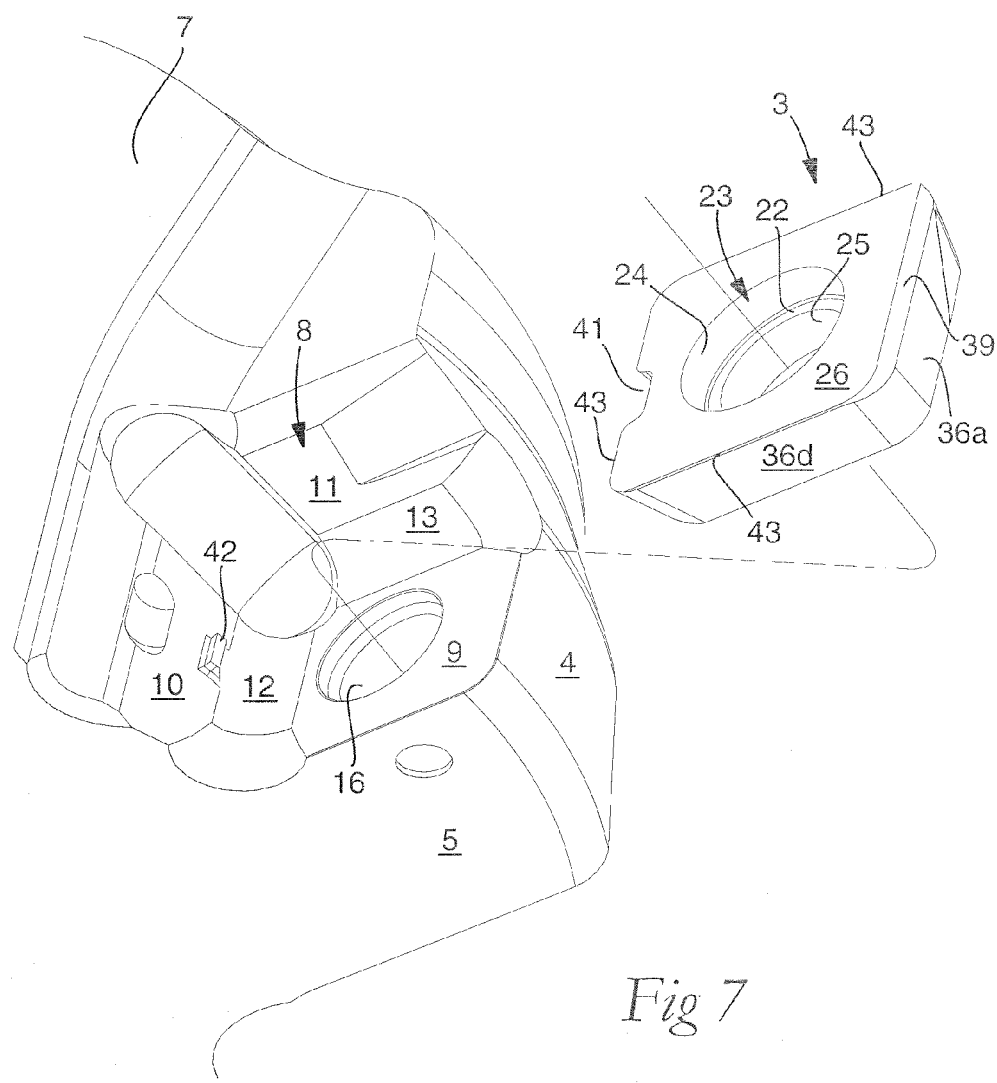
FIG. 7 is a perspective exploded view showing an individual shim plate spaced-apart from an appurtenant seat in the basic body.

As may be best seen in FIG. 7, the individual seat 8 includes, on one hand, a plane bottom surface 9, against which the underside of the shim plate 3 is pressable, and on the other hand two plane side support surfaces 10, 11 against which a pair of side surfaces of the shim plate are pressable. Between the bottom surface 9 and the side support surfaces 10, 11, there are concave clearance surfaces 12, 13, which do not contact the shim plate. Against the side support surfaces 10, 11, also the lower parts of two side surfaces 34 of the milling insert 2 are pressed. The side support surface 11 has the purpose of carrying the axial forces that act on the milling insert and the shim plate, respectively, while the side support surface 10 carries the radial cutting forces at the same time as the bottom surface 9 carries the tangential cutting forces.

In FIG. 7, it should be observed that a hole 16 mouths in the bottom surface 9 of the seat. In an inner part, the hole 16 includes a (non visible) female thread.

In the example, the milling insert 2 and the shim plate 3 are fixed together in the appurtenant seat 8 by two screws 18, 19 (see FIGS. 1 and 2), the last-mentioned one of which is a tubular screw that includes, on one hand, a male thread 20, which can be tightened in the female thread of the hole 16, and on the other hand an internal female thread (not visible). At the end thereof spaced apart from the male thread 20, the tubular screw 19 has a ring-shaped collar 21, which is pressable against a ring-shaped shoulder 22 in a through hole 23 by the shim plate 3. This shoulder 22 separates two hole sections 24, 25 of different diameters. More precisely, the first section 24 adjacent to the upperside 26 of the shim plate has a greater diameter than the second hole section 25 that mouths in the underside 27 of the shim plate.

As previously has been mentioned, the tubular screw 19 has the purpose of securing the shim plate 3 semi-permanently to the basic body 1, more precisely in the seat 8. The screw 18, on the other hand, has the purpose of fixing the milling insert 2 against the shim plate 3. For this purpose, the screw 18 includes a head 28 and a shank having a male thread 29 that can be tightened in the internal female thread of the tubular screw 19. Like the shim plate 3, the milling insert 2 includes a through hole 30 that mouths in the upperside 31 of the milling insert (see FIG. 1) as well as in the underside 32 thereof (see FIG. 2). Concerning the milling insert 2, it should also be pointed out that the same is indexable, more precisely by in this case including four cutting edges 33 formed in the transition between the upperside 31 and four clearance surfaces 34, which extend between the upperside and the underside. In this connection, it should be pointed out that the milling insert as well as the shim plate also may have other basic shapes than quadrangular or quadratic, e.g., round, triangular or in another way a polygonal shape.

In FIGS. 3-6, it is illustrated how the milling insert 2 and the shim plate 3 assume a special tipping-in position in the basic body. More precisely, the milling insert 2 is tipped in at a certain axial, positive tipping-in angle α, as well as a certain negative, radial tipping-in angle β. The last-mentioned angle β, which usually varies within the range of 6-16°, is defined by the angle that the upperside 31 of the milling insert forms with an imaginary radius "r" between the center axis C1 of the basic body and a peripheral, active cutting edge of the milling insert. In an analogous way, the angle α is defined by the angle at which the milling insert leans axially in relation to the center axis C1. Usually, the angle α is within the range of 10-25°. In the example, α amounts to approx. 17° and β to approx. 10°.

In order to separate the active cutting edge, which during milling removes chips from the workpiece, from the three other, inactive cutting edges 33 of the milling insert, the same has been provided with the suffix "a" in FIGS. 1, 2, 5 and 6. Each cutting edge 33 transforms at a corner of the milling insert into a surface-wiping secondary edge 35, which usually is denominated "wiper edge". The secondary edge, which co-operates with the presently chip-removing cutting edge 33a, is designated 35a. Here it should be mentioned that the active cutting edge 33a runs essentially axially, while the active secondary edge 35a runs radially.

Figure 6:
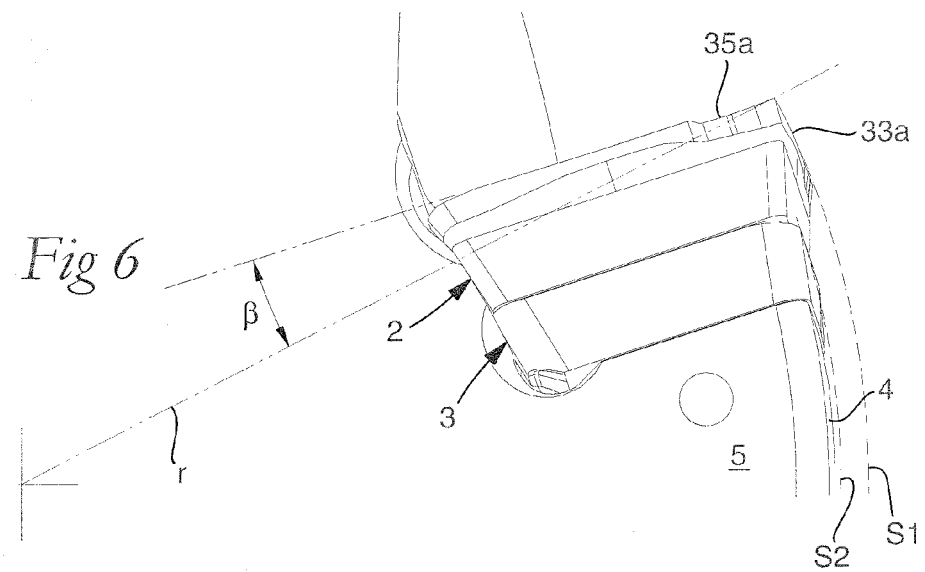
FIG. 6 is a detailed end view that illustrates the radial tipping-in angle of the milling insert.

In FIG. 6 (see also FIG. 17), S1 designates the imaginary circle described by the cutting edge 33a during the rotation of the basic body. A second circle S2 situated inside the circle S1 marks the circular path in which the radially outermost edge portion of the shim plate 3 moves during the rotation of the basic body.

Figure 5:
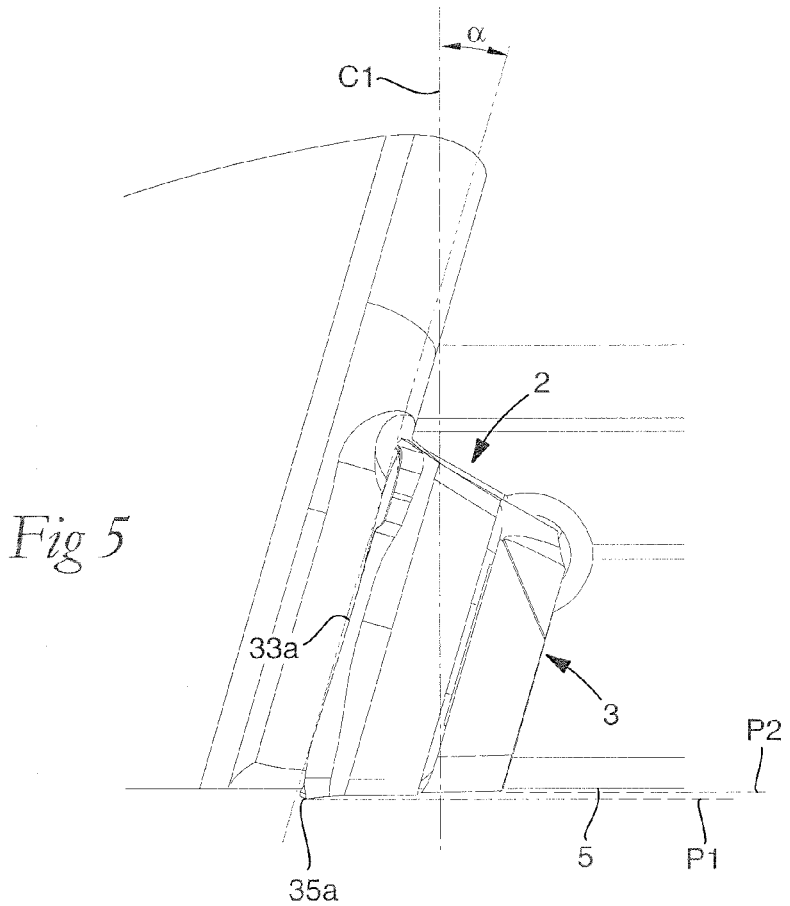
FIG. 5 is an enlarged detailed side view that illustrates the axial tipping-in angle of the individual milling insert.

In FIG. 5, P1 designates the plane in which the secondary edge 35a moves during the rotation of the basic body. In an analogous way, the axially front (or lower) edge portion of the shim plate 3 moves in a plane P2. It should be noted that not only the plane P1 but also the plane P2 is situated at a distance in front of the front end surface 5 of the milling cutter body.

Reference is now made to FIGS. 8-17, which in detail illustrate the design of the shim plate 3 according to an embodiment of the invention. As pointed out previously, the shim plate 3 includes an upperside 26 and an underside 27, between which the through hole 23 extends. In the present example, in which the shim plate is in the form of a quadrilateral, four side surfaces generally designated 36 extend between the upperside and the underside. Because some of these side surfaces have a shape that differs from the shape of other side surfaces, the same have been provided with the suffixes a, b, c, d to be mutually separatable. In this connection, it should be pointed out that the shim plate 3, in contrast to the milling insert 2 that can be indexed in four different positions, always assumes one and the same position in the seat 8. Accordingly, the side surface 36a is always facing radially outward from the center axis C of the basic body 1 and peripherally situated in the basic body, more precisely in the vicinity of the envelope surface 4 thereof. The diametrically opposed side surface 36b is situated closest to the center axis C1 of the basic body and pressed against the side support surface 10 (see also FIG. 7). Furthermore, the side surface 36c is pressed against the side support surface 11 of the seat 8. Finally, the side surface 36d is located in the vicinity of the front end surface 5 of the basic body 1. At the four corners of the shim plate 3, said side surfaces 36a, 36b, 36c, 36d transforms into each other via convexly arched corner surfaces 37. Between the upperside 26 and each one of the side surfaces, there are edge portions designated 38a, 38b, 38c and 38d. In this case, the shim plate has what by those skilled in the art is denominated "positive" basic shape, so far that all side surfaces 36 are tilted in the direction inward/rearward from the upperside 26 toward the underside 27. By analogy with the clearance surfaces 34 of the milling insert 2, the side surfaces 36 may be regarded as clearance surfaces, the clearance angles of which are designated γa, γb, γc and γd (see FIGS. 12-15). In the embodiment shown, the clearance angles γa and γb amount to 10° and 14°, respectively, while the clearance angles γc and γd amount to 17° and 14°, respectively. From what has been described above it follows that the area of the underside 27 is generally smaller than the area of the upperside 26.

Characteristic of the shim plate according to the embodiment is that the radially outer edge portion 38a thereof, which serves as an auxiliary cutting edge in the event of an insert breakdown, includes a chamfer surface 39 that forms an obtuse angle δ (see FIG. 16) with the upperside 26 (implying that the angle ε between the chamfer surface and an imaginary plane in the extension of the upperside becomes acute). In the shown, preferred embodiment, the obtuse angle δ amounts to 150°. This angular value may however vary upward as well as downward from at least 130° to at most 170°. Most suitably, the angle δ is within the range of 140-160°.

With the side surface 36a, the chamfer surface 39 forms a second, obtuse angle λ. When the clearance angle γa of the side surface 36a amounts to 10° (as exemplified above), λ will amount to 110°. Also the angle λ may vary, but should amount to at least 95° and at most 130°.

The angle σ between the side surface 36a and the underside 27 is obtuse (amounts in the example to 100°).

Figure 8:
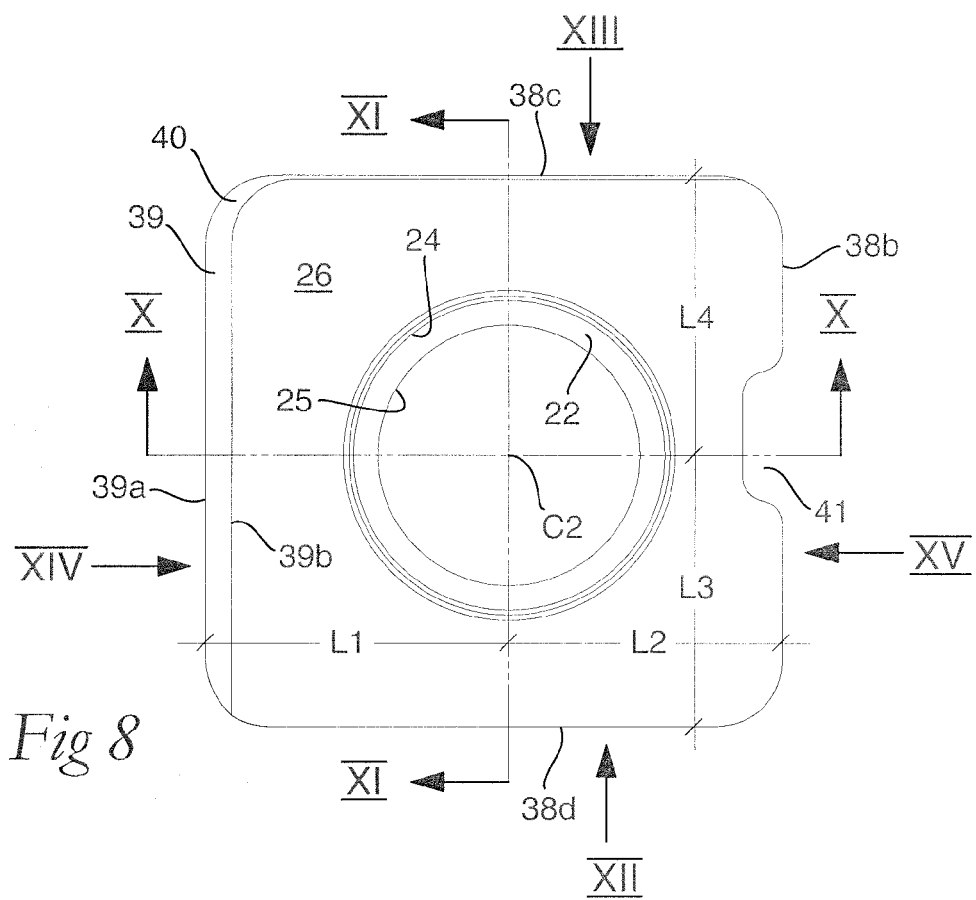
FIG. 8 is an enlarged planar view from above of the shim plate.

As may be best seen in FIG. 8, the chamfer surface 39 extends essentially along the entire axial length of the shim plate, the same being delimited between two boundary lines 39a, 39b, which advantageously are mutually parallel. At the corner that borders on the edge portion 38c, a curved and successively tapering transition surface 40 is present. The width W2 of the chamfer surface (see FIG. 16) may vary depending on the dimensions of the milling insert and shim plate. For milling inserts and shim plates having an IC measure of less than 10 mm, W2 may be within the range of 0.2-0.5 mm, while the corresponding measure for larger shim plates should be more than 0.5 mm. In the exemplified embodiment, the width measure W1 of the shim plate (see FIG. 10) amounts to approx. 12 mm. In this connection, W2 amounts to 0.6 mm. In other words, the chamfer surface 39 occupies approx. 5% of the total width W1 of the shim plate. In practice, W2 should amount to at least 3% and at most 10% of W1.

Advantageously, the shim plate 3 is manufactured from cemented carbide or another equivalent material that is harder than the material of the basic body 1 (which usually is steel or aluminium). In this connection, the shim plate is formed with an upperside and an underside 26, 27 that are plane and suitably mutually parallel. When the requirements of machining precision and service life are great, the upperside 26 as well as the underside 27 should be precision ground. The other surfaces of the shim plate may however be directly pressed, i.e., unground.

Advantageously—though not necessarily—the chamfer surface 39 may also be plane. The two boundary lines 39a, 39b, which delimit the chamfer surface, may either be sharp edges or smoothly rounded radius transitions. When the upperside and the underside 26, 27 are being face ground, the grinding should be driven so far that the respective surfaces obtain a surface roughness that amounts to at most Ra 10 μm.

In the shown, preferred embodiment of the shim plate according to the embodiment, a countersink 41 (see FIGS. 7-9) is formed in the side surface 36b that is diametrically opposite to the side surface 36a, which countersink may co-operate with a knob 42 (see FIG. 7) provided adjacent to the boundary line between the surfaces 10 and 12. The task of the knob 42 and of the countersink 41 is to make impossible incorrect mounting of the shim plate. It should be particularly pointed out that the described chamfer surface 39 is formed only along the edge portion that, when need arises, should serve as a cutting edge. At the other three edge portions, the upperside 26 directly meets the connecting side surfaces 36b, 36c, 36d, more precisely via straight edge lines 43 (see FIG. 7).

Figure 9:
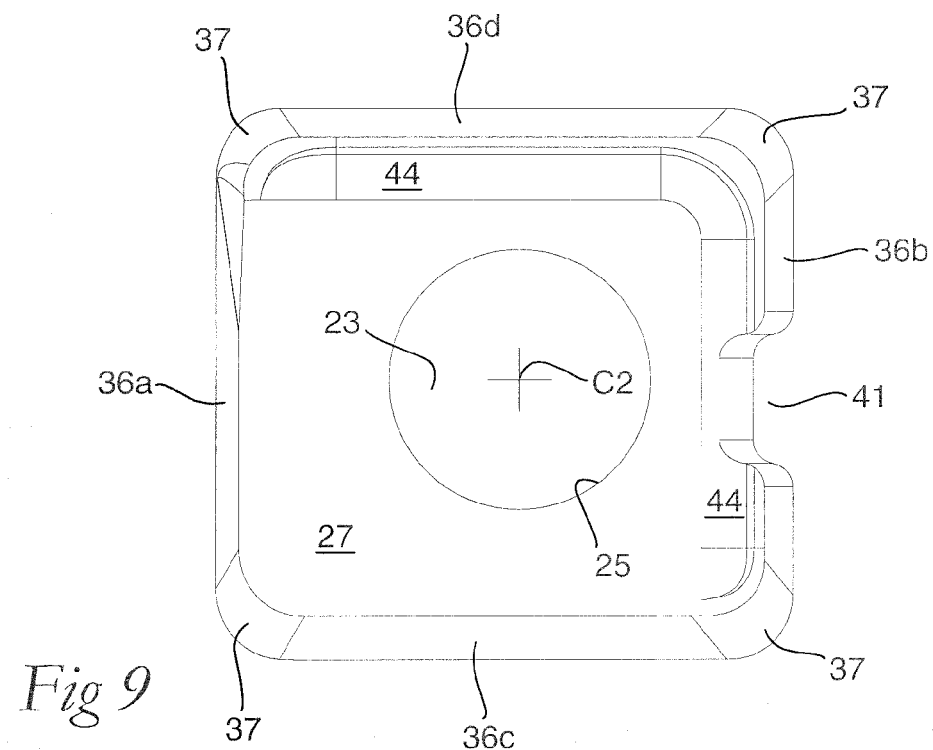
FIG. 9 is a planar view from below of the same shim plate.
Figure 10:
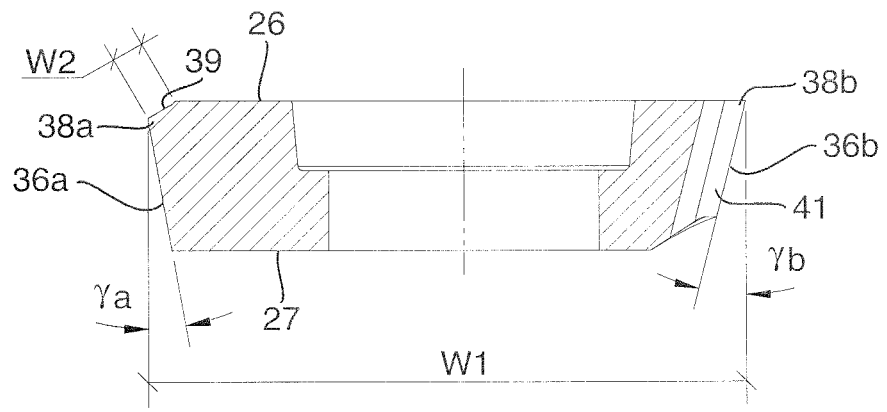
FIG. 10 is a cross section X-X in FIG. 8.
Figure 11:
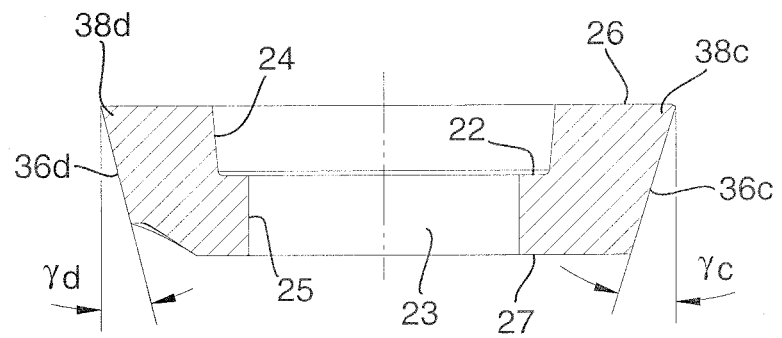
FIG. 11 is a cross section XI-XI in FIG. 8.
Figure 12:
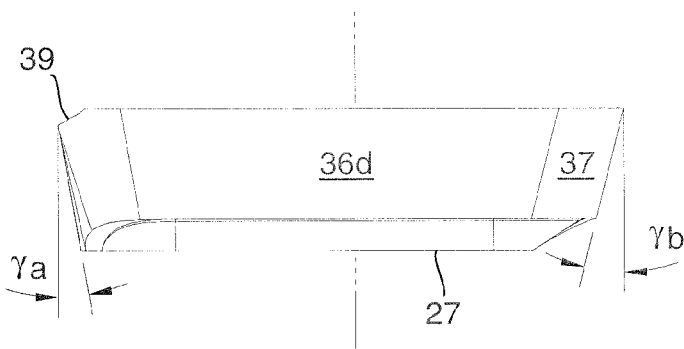
FIG. 12 is a side view XII in FIG. 8.
Figure 13:
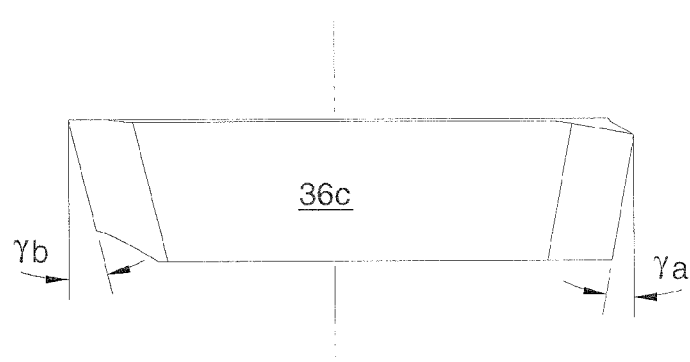
FIG. 13 is a side view XIII in FIG. 8.
Figure 14:
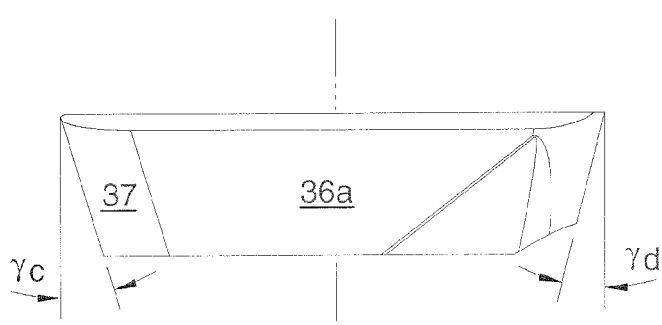
FIG. 14 is a side view XIV in FIG. 8.
Figure 15:
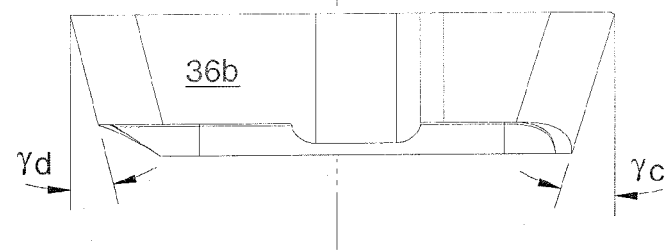
FIG. 15 is a side view XV in FIG. 8.
Figure 16:
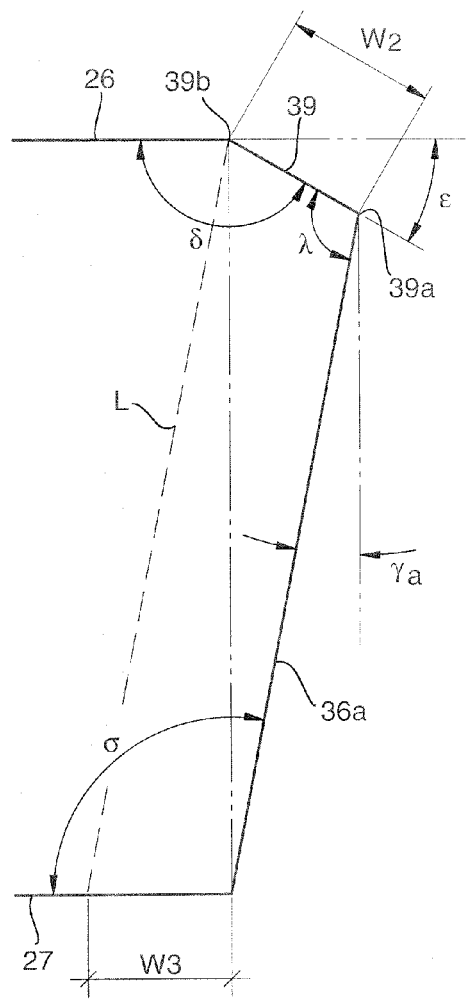
FIG. 16 is a very enlarged detailed picture showing the geometry of the shim plate adjacent to an edge portion serving as an auxiliary cutting edge.

It should also be noted that the through hole 23 is not centrically placed in the shim plate. Thus, the center axis C2 of the hole is situated somewhat nearer the radially inner side surface 36b than the radially outer side surface 36a. In FIG. 9, it is furthermore seen that concavely arched clearance surfaces 44 are formed between the plane underside 27 and each one of the two side surfaces 36b and 36d that rest against a side support surface in the seat 8 of the basic body.

Under normal circumstances, the individual shim plate serves in the usual way as a tangential force-carrying shim for the milling insert. An important task for the shim plate is to protect the basic body in various ways, among other things by counteracting heat transfer directly from the milling insert to the basic body, and to secure a good position precision of the milling insert and a long service life of the basic body. If an insert breakdown would occur, e.g., by the milling insert cracking or being crushed, the radially outer edge portion of the shim plate can assume the cutting function of the active cutting edge and proceed to remove chips from the workpiece until the milling tool can be stopped. In such a way, the shim plate—or, in the worst case, the proper basic body—is prevented from digging into the workpiece.

In order to make clear the technical difference between previously known shim plates for replaceable milling inserts of cutting tools (see e.g., U.S. Pat. No. 3,341,920, U.S. Pat. No. 3,540,102, U.S. Pat. No. 4,938,639, U.S. Pat. No. 5,938,377, EP 0342692 and WO 2006/130073) and the shim plate according to the embodiment, a dash-dotted line L has been introduced in FIG. 16 and that represents a side surface that is included in a traditional shim plate and directly meets the upperside of the shim plate without any intervening chamfer surface. In this case, the edge portion in question of the shim plate becomes generally acute by the fact that the angle between the upperside and the upper part of the side surface becomes acute (in negative geometries at most 90°). For this reason, the edge portion becomes comparatively weak and not very resistant to the abrupt forces that the same is subjected to in connection with a possibly insert breakdown. Therefore, its capability of serving as an auxiliary cutting edge becomes unreliable.

Figure 17:
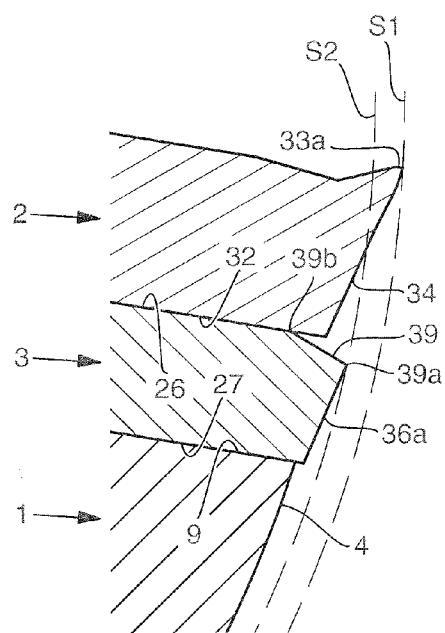
FIG. 17 is a detailed picture showing the milling insert mounted on a shim plate semi-permanently fixed in the basic body.

By forming, in accordance with the invention, a chamfer surface between the upperside of the shim plate and the radially outer side surface thereof (and placing the chamfer surface in the direction of rotation behind the active cutting edge), the edge portion serving as an auxiliary cutting edge is strengthened so that the same can resist great and abrupt forces in connection with an insert breakdown. Furthermore, as is seen in FIG. 17, the underside 32 of the milling insert 2 can corbel out a distance past the inner boundary line 39b of the chamfer surface 39 without projecting past the side surface 36a of the shim plate. This means that the shim plate 3 can be formed with a supporting underside 27 that is larger than the corresponding undersides of conventional shim plates. More precisely, the underside 27 can be given an extra width measure W3 (see FIG. 16) without the function of the shim plate being jeopardized irrespective of whether the milling insert 2 is in working order or not. If the milling insert is intact, the radially outer boundary line 39a of the chamfer surface accordingly describes a circular path S2 that is situated inside the corresponding circular path S1 of the cutting edge 33a. Should the milling insert break down and the edge portion of the shim plate assume the chip-removing function of the cutting edge, the circular path S2 is reliably situated radially outside the envelope surface 4 of the basic body. Because the underside 32 of the milling insert projects a distance radially from the inner boundary line 39b of the chamfer surface 39 in the described way, it is in addition ensured that repeated insert exchanges do not cause coining in the upperside of the shim plate. Furthermore, it should be noted that the shim plate utilizes the entire bottom surface 9 of the seat 8 as a tangential support, more precisely by the underside 27 thereof projecting a short distance radially outside the envelope surface 4 of the basic body, as is seen in FIG. 17. With continued reference to FIG. 17, it should be pointed out that while the radially outer boundary line 39a of the chamfer surface 39 is situated radially outside the envelope surface 4, the inner boundary line 39b thereof is situated inside the same.

The invention is not limited only to embodiments described above and shown in the drawings. Thus, the shim plate (and the milling insert) may have other polygonal basic shapes than quadratic or quadrangular. It is also possible to apply the invention to round shim plates for round, indexable milling inserts. In the last-mentioned case, the chamfer surface in question needs to extend only along a part of the circular, endless edge portion of the shim plate. For instance, the arc length of the chamfer surface may amount to 45-90°, while the remaining edge portion lacks chamfer surface. Neither needs the upperside and underside of the shim plate to be parallel to each other. In addition, the underside of the shim plate does not necessarily need to be plane. Thus, the underside may be a serration surface or another connecting surface of the type that includes male members that engage female members in the bottom surface of the seat. In such cases, the underside does not need to be ground. Furthermore, it should be pointed out that the fixation of the milling insert against the shim plate does not necessarily need to take place by a tightening screw co-operating with a tubular screw, of the type that has been exemplified in the drawings. Thus, it is possible to semi-permanently connect the shim plate with the basic body via a device other than a tubular screw, e.g., by a simple screw having a head and a male thread, while the milling insert is fixed by clamps, wedges or the like. In the embodiment, the shim plate is shown as a single solid body of cemented carbide or the like. However, it is also possible to manufacture the same from two or more integrated parts of different materials, e.g., cemented carbide and steel.

While the invention has been disclosed with reference to certain preferred embodiments, numerous modifications, alterations, and changes to the described embodiments are possible without departing from the sphere and scope of the invention, as defined in the appended claims and their equivalents thereof. Accordingly, it is intended that the invention not be limited to the described embodiments, but that it have the full scope defined by the language of the following claims.

What is claimed is:

1. A shim plate for milling tools for chip removing machining, comprising:
    an upperside, an underside, and at least one side surface extending between the upperside and the underside and forming an angle ≦90° with the upperside; and
    a through hole including a first section mouthing in the upperside, and a second section mouthing in the underside and having a diameter that is smaller than a diameter of the first section,
    wherein the upperside at least partially transforms into the side surface via an edge portion configured to be an active auxiliary chip-removing cutting edge upon failure of a cooperating cutting insert,
    wherein the edge portion includes a chamfer surface that forms an obtuse angle (δ) with the upperside, and
    wherein the through hole in the shim plate is not centrically placed in the shim plate.

2. The shim plate according to claim 1, wherein the obtuse angle (δ) amounts to at least 130°.

3. The shim plate according to claim 1, wherein the obtuse angle (δ) amounts to at most 170°.

4. The shim plate according to claim 1, wherein the obtuse angle (δ) is within the range of 140-160°.

5. The shim plate according to claim 1, wherein the chamfer surface forms a second obtuse angle (λ) with the side surface.

6. The shim plate according to claim 5, wherein the second obtuse angle (λ) amounts to at least 95°.

7. The shim plate according to claim 5, wherein the second obtuse angle (λ) amounts to at most 130°.

8. The shim plate according to claim 1, wherein the upperside is a plane surface.

9. The shim plate according to claim 8, wherein the underside is a plane surface.

10. The shim plate according to claim 9, wherein the upperside as well as the underside are ground and have a surface roughness that amounts to at most Ra 10 μm.

11. The shim plate according to claim 1, wherein the upperside has an area that is larger than an area of the underside.

12. The shim plate according to claim 1, wherein the upperside and the underside are parallel to each other.

13. The shim plate according to claim 1, the shim plate defining a polygonal basic shape by comprising at least three side surfaces that meet each other in the same number of corners.

14. The Shim plate according to claim 13, the shim plate being a quadrilateral comprising four side surfaces that meet each other in pairs at an angle of 90° in four corners.

15. The shim plate according to claim 14, wherein all four side surfaces are plane.

16. A shim plate for milling tools for chip removing machining, comprising:
    an upperside, an underside, and at least one side surface extending between the upperside and the underside and forming an angle ≦90° with the upperside; and
    a through hole including a first section mouthing in the upperside, and a second section mouthing in the underside and having a diameter that is smaller than a diameter of the first section,
    wherein the upperside at least partially transforms into the side surface via an edge portion configured to be an active auxiliary chip-removing cutting edge upon failure of a cooperating cutting insert,
    wherein the edge portion includes a chamfer surface that forms an obtuse angle (δ) with the upperside, and
    wherein the chamfer surface is formed along a first side surface, but not along the other side surfaces.

17. The shim plate according to claim 1, wherein the chamfer surface has a width that amounts to at least 3% and at most 10% of the total width of the shim plate.

18. A milling tool for chip removing machining, comprising:
    a basic body, which includes two ends between which a center axis (C1) extends, around which the basic body is rotatable and with which an envelope surface is concentric;
    an indexable milling insert, which includes an upperside, an underside and at least one clearance surface that extends between the upperside and the underside and connects to a chip-removing cutting edge; and
    a shim plate, comprising;
        an upperside against which the underside of the milling insert is pressed;
        an underside that is pressed against a bottom in a seat recessed in the basic body;
        at least one side surface extending between the upperside and the underside and forming an angle of ≦90° with the upperside; and
        a through hole extending between the upperside and the underside of the shim plate, the through hole including an upper section having a greater diameter than a lower section, to house a screw semi-permanently fixed in the basic body,
    wherein the upperside of the shim plate at least partially transforms into the side surface via an edge portion configured to be an auxiliary chip-removing cutting edge upon failure of the milling insert,
    wherein the edge portion of the shim plate includes a chamfer surface that is delimited between outer and inner boundary lines and forms an obtuse angle (δ) with the upperside of the shim plate, and wherein the underside of the milling insert projects radially a distance past the inner boundary line of the chamfer surface without projecting past the side surface of the shim plate.

19. The milling tool according to claim 18, wherein the screw is a tubular screw in which a tightening screw for the fixation of the milling insert is tightened.

20. The milling tool according to claim 18, wherein the underside of the shim plate projects radially a distance from the envelope surface of the basic body, and the outer boundary line of the chamfer surface is tangent to an imaginary circle (S2), the center of which coincides with the center axis (C1) of the basic body, and which is situated radially outside the envelope surface of the basic body as well as radially inside an imaginary circle (S1) described by the chip-removing cutting edge of the milling insert during the rotation of the basic body.

21. The milling tool according to claim 20, wherein the radially inner boundary line of the chamfer surface is situated radially inside the envelope surface of the basic body.

22. The milling tool according to claim 18, wherein the chamfer surface extends essentially along the entire axial length of the shim plate.

23. The milling tool according to claim 18, wherein the through hole in the shim plate is not centrically placed in the shim plate.

24. The milling tool according to claim 23, wherein a center axis (C2) of the through hole in the shim plate is situated nearer a radially inner side surface than a radially outer side surface of the shim plate.

25. A milling tool for chip removing machining, comprising:
    a basic body, which includes two ends between which a center axis (C1) extends, around which the basic body is rotatable and with which an envelope surface is concentric;
    an indexable milling insert, which includes an upperside, an underside and at least one clearance surface that extends between the upperside and the underside and connects to a chip-removing cutting edge; and
    a shim plate, comprising;
        an upperside against which the underside of the milling insert is pressed;
        an underside that is pressed against a bottom in a seat recessed in the basic body;
        at least one side surface extending between the upperside and the underside and forming an angle of ≦90° with the upperside; and
        a through hole extending between the upperside and the underside of the shim plate, the through hole including an upper section having a greater diameter than a lower section, to house a screw semi-permanently fixed in the basic body,
        wherein the upperside of the shim plate at least partially transforms into the side surface via an edge portion configured to temporarily be an auxiliary chip-removing cutting edge upon failure of the milling insert,
        wherein the edge portion of the shim plate includes a chamfer surface that is delimited between outer and inner boundary lines and forms an obtuse angle (δ) with the upperside of the shim plate, and
        wherein the through hole in the shim plate is not centrically placed in the shim plate;
    wherein the underside of the milling insert projects radially a distance past the inner boundary line of the chamfer surface.

26. The milling tool according to claim 25, wherein a center axis (C2) of the through hole in the shim plate is situated nearer a radially inner side surface than a radially outer side surface of the shim plate.

27. The shim plate according to claim 16, wherein the through hole in the shim plate is not centrically placed in the shim plate.

28. The shim plate according to claim 27, wherein a center axis (C2) of the through hole in the shim plate is situated nearer a radially inner side surface than a radially outer side surface of the shim plate.

29. The shim plate according to claim 16, wherein the chamfer surface forms a second obtuse angle (λ) with the side surface.

30. The shim plate according to claim 16, wherein at least one of the upperside and the underside is a plane surface.

31. The shim plate according to claim 16, wherein the upperside and the underside are ground and have a surface roughness that amounts to at most Ra 10 μm.

32. The shim plate according to claim 16, wherein the upperside has an area that is larger than an area of the underside.

33. The shim plate according to claim 16, wherein the upperside and the underside are parallel to each other.

34. The shim plate according to claim 16, the shim plate defining a polygonal basic shape by comprising at least three side surfaces that meet each other in the same number of corners.

35. The shim plate according to claim 16, wherein the at least one side surface extending between the upperside and the underside forms an angle of <90° with the upperside.

36. The shim plate according to claim 1, wherein the at least one side surface extending between the upperside and the underside forms an angle of <90° with the upperside.

* * * * *